United States Patent Office 3,081,284
Patented Mar. 12, 1963

3,081,284
FAST CURING HALOGENATED POLYMERS
George E. Serniuk, Roselle, Delmer L. Cottle, Highland Park, and Leon S. Minckler, Jr., Metuchen, N.J., assignors to Esso Research and Engineering Company, a corporation of Delaware
No Drawing. Filed July 9, 1959, Ser. No. 825,879
4 Claims. (Cl. 260—85.3)

This invention relates to the halogenation of olefin-multiolefin copolymers such as butyl rubber with pyridine dihalides. It is known that butyl rubber may be halogenated with gaseous chlorine, liquid bromine or the like to produce halogenated rubbery copolymers which are vulcanizable with zinc oxide alone or with compositions comprising sulfur and/or thiocarbamates or thiuram sulfides. However, the vulcanization of such halogenated copolymers is not always as rapid as would be desirable and the halogenated copolymers are not always as highly unsaturated as they should be to facilitate curing with mechanisms which are inactive for unhalogenated butyl rubber.

In accordance with the present invention, the foregoing disadvantages are overcome and halogenated olefin-multiolefin copolymers, especially halogenated butyl rubber copolymers which cure very rapidly and which are of increased unsaturation, as shown by high iodine numbers, are produced by halogenating the rubbery copolymer, preferably while dissolved in an inert solvent, with a minor proportion of at least one pyridine dihalide. Suitable pyridine dihalides, for the purposes of the present invention include pyridine difluoride, pyridine diiodide, and/or especially pyridine dichloride or pyridine dibromide, mixtures thereof, etc.

It is a further discovery of the present invention that when rubbery olefin-multiolefin copolymers and, particularly, olefin-multiolefin (and/or isoolefin-multiolefin) copolymers of the type of butyl rubber, are halogenated with pyridine dihalides in accordance with the present invention, polymers of higher intrinsic viscosity and molecular weight are obtained if the solvent in which the rubber is dissolved during halogenation is unreactive with the pyridine dihalide and is preferably substantially saturated. The substantially saturated solvent is advantageously a hydrocarbon solvent and especially a paraffinic hydrocarbon-type solvent. In the instances where it is desired to convert a partially unsaturated solvent into a substantially saturated solvent by removing olefinic materials, such olefins may be stripped out by fractionation, may be treated with such chemicals as aluminum chloride, or the solvent may be directly hydrogenated to accomplish the same purpose. Particularly outstanding results have been obtained by employing aluminum chloride treated $C_5$ to $C_7$ and especially $C_6$ fractions of virgin naphthas. It has been found that when the bromine number of the solvent is below about 0.2, advantageously below about 0.1, and even more especially below about 0.05, halogenated polymers of surprisingly high intrinsic viscosity (i.e., molecular weight) are produced.

In practicing the present invention, the halogenation of an olefin-multiolefin copolymer, preferably of the butyl rubber type, is accomplished, advantageously by preparing a 1 to 25, preferably a 5 to 15 weight percent solution of the copolymer as above, in a suitable inert liquid organic solvent such as an inert hydrocarbon or advantageously halogenated derivatives of saturated hydrocarbons, examples of which are hexane, heptane, saturated petroleum streams, benzene, chlorobenzene, chloroform, trichloroethane, carbon tetrachloride, etc. There is then added to the solution formed, about 0.1 to 10.0, advantageously about 0.3 to 7.0 and preferably about 0.5 to 4.0 moles of pyridine dihalide per mole of double bonds in the copolymer. The halogenation may be conducted at a temperature level of about 0° to +150° C., advantageously at about 0° to 100° C. and preferably at about 20° to 70° C. for about 1 or 5 to 360 minutes and especially for about 20 to 60 minutes. The pressure is not critical and may vary from about 1 to about 500 p.s.i.a., depending up the foregoing temperatures and reaction times. Vulcanization of the pyridine dihalide halogenated butyl rubber copolymer formed may be at about 200° to 400° F., preferably at about 250° to 350° F. for about 5 to 300 minutes, preferably for about 10 to 100 minutes in the presence of about 2 to 30, preferably about 3 to 20 weight percent based on copolymer of a zinc and oxygen-containing compound such as zinc stearate and/or especially zinc oxide, with or without such other added compounding ingredients as sulfur; accelerators, especially including thiocarbamates and/or thiuram sulfides; quinoid compounds; diamines; plasticizers; waxes; resins or fillers such as carbon black, clays, $TiO_2$, MgO, CaO, mixtures thereof, etc.

In preparing the pyridine dihalide, for use in accordance with the present invention, a halogenating agent such as fluorine, chlorine, bromine, iodine, iodine chloride, iodine bromide, etc. is reacted with about 0.5 to 3.0 and preferably about 1.0 to 2.0 moles of pyridine at a temperature level of say about −50° to +60° C., preferably at about −10° to +25° C. (e.g., 0° C.) for about 2 to 360 minutes and preferably for about 20 to 60 minutes. Each reactant is advantageously dissolved to form an 0.10 to 10.0, preferably an 0.20 or 0.25 to 4.0 or 5.0 molar solution in such solvents as bromotrichloro methane, nitrobenzene, difluorotetrachloro ethane, hexafluoro ethane, and/or carbon tetrachloride, etc., or no solvent may be required as in the preparation of the diiodide. When using the solution technique, the pyridine dihalide settles out as an insoluble solid which may be recovered almost quantitatively by filtration or by any other conventional recovering procedure.

Butyl rubber, a term well known in the rubber art, e.g., chapter 24 in "Synthetic Rubber," edited by G. Whitby, is a rubbery copolymer comprising a major proportion of a monoolefin (generally an isoolefin) having about 4 to 7 or 8 carbon atoms and a minor proportion of a multi-olefin (generally a diolefin) having about 4 to 8 or 12 carbon atoms. The most commonly employed monoolefin is isobutylene, although other monoolefins such as 3-methyl-1-butene and 4-methyl-1-pentene may be used. Suitable multiolefins, which are generally conjugated diolefins, include isoprene, 1,3-butadiene, 2,3-dimethyl 1,3-butadiene, piperylene and the like as well as myrcene, dimethallyl, allo-ocimene, vinyl fulvenes, etc. Generally, the butyl rubber copolymer contains about 85 to 99.5 weight percent isoolefin (e.g., isobutylene) and 0.5 to 15.0 weight percent diolefin, which in most instances is isoprene. The polymerization is generally carried out at a low temperature, e.g., between about −50° and −165° C. or lower, in the presence of a Friedel-Crafts catalyst, such as aluminum tribromide or especially aluminum trichloride, dissolved in a $C_1$ to $C_3$ alkyl halide, such as methyl chloride, ethyl chloride, etc. The preparation of butyl rubber is more fully described in U.S. Patent 2,356,128. Butyl rubber has a viscosity average molecular weight of between about 200,000 and 1,500,000 or more and a Wijs iodine number of between about 0.5 and 50, preferably about 1.0 to 20.

In order to more fully illustrate but not to limit the present invention, the following experimental data are given:

*Example 1*

Pyridine dibromide was prepared as follows: Sixteen grams of bromine, dissolved in 25 ml. of carbon tetrachloride, were slowly added, with stirring, to an ice cold solution of 7.9 grams of pyridine in 25 ml. of carbon tetrachloride. When all of the bromine solution had been added, a large mass of orange colored crystals formed which was recovered by filtration. The resulting product consisted of 23 grams of pyridine dibromide.

Halogenation of an isobutylene-isoprene butyl rubber copolymer having a Mooney viscosity at 212° F. for 8 minutes of 67, an intrinsic viscosity in diisobutylene at 25° C. of 1.35 and an iodine number of 10.4 was carried out as follows: A 2 liter flask, fitted with a mechanical stirrer and thermometer, was charged with 100 grams of the above-described butyl rubber dissolved in 1,000 ml. of an aluminum chloride treated hexane fraction. To this solution of butyl rubber were added various quantities of pyridine dibromide or liquid bromine as a control with the following results upon reaction for 2 hours at 25° C. (i.e., 77° F.).

| Sample | (a) | (b) | (Control) |
|---|---|---|---|
| Pyridine Dibromide (grams) | 6.5 | 9.75 | |
| Liquid Bromine | | | 4.20 |
| Moles of reagent per mole of polymer double bonds | 1.0 | 1.5 | 1.3 |
| Percent Combined Bromine in Product | 1.32 | 2.17 | 2.11 |
| Iodine No. (cgs. of $I_2$/g.) | 8.60 | 7.60 | 5.40 |
| Intrinsic Viscosity | 1.363 | 1.363 | 1.074 |

The above data show, unexpectedly, that the pyridine dihalide halogenation of butyl rubber results in a product having a higher iodine number and intrinsic viscosity than does the control wherein butyl rubber was halogenated with elemental halogen.

100 parts by weight of samples (a), (b) and the "control" were compounded with 5.0 parts by weight of the curative zinc oxide, 50 parts by weight of S.R.F. carbon black as filler, and 1.0 part by weight of stearic acid as lubricant with the following results when cured at 287° F. for the times indicated:

| Curing Time (Min.) | 300% Modulus (p.s.i.) | | | | Tensile Strength (p.s.i) | | | | Elongation (percent) | | | |
|---|---|---|---|---|---|---|---|---|---|---|---|---|
| | 15 | 30 | 45 | 60 | 15 | 30 | 45 | 60 | 15 | 30 | 45 | 60 |
| Sample (a) | 1,034 | 1,078 | 1,262 | 1,016 | 1,920 | 1,973 | 2,113 | 1,983 | 463 | 450 | 420 | 443 |
| Sample (b) | 1,903 | 1,825 | 1,879 | 1,789 | 1,999 | 2,075 | 2,101 | 2,052 | 310 | 353 | 320 | 356 |
| Control | No cure. | 364 | 1,439 | 1,409 | No cure. | 824 | 1,863 | 1,788 | No cure. | 607 | 400 | 383 |

The above data show that butyl rubber brominated with pyridine dibromide cures more rapidly than butyl rubber brominated with liquid bromine.

Example 2

The same general procedure as in Example 1 was repeated at a reaction temperature of 69° C. (156° F.) using the same butyl rubber and the respective brominating agents pyridine dibromide or liquid bromine with the following results:

| | Sample (c) (of the invention) | (Control) |
|---|---|---|
| Percent Combined bromine in product | 2.37 | 2.66 |
| Iodine No. (cgs. of $I_2$/g.) | 44.0 | 5.50 |

The above data show that by halogenating butyl rubber at elevated temperatures with pyridine dihalides, there is produced a rubber of greatly increased iodine number whereas this is not so when using elemental bromine.

100 parts by weight each of sample (c) and the "control" were compounded as in Example 1 with the following results when cured at 287° F.:

| | 300—Modulus (p.s.i.) | | Tensile Strength (p.s.i.) | | Elongation Percent | |
|---|---|---|---|---|---|---|
| Curing time, min. | 15 | 30 | 15 | 30 | 15 | 30 |
| Sample (c) | 20,18 | 2,066 | 2,018 | 2,066 | 300 | 300 |
| Control | No cure | 294 | No cure | 471 | No | 596 |

The above data show that butyl rubber halogenated with pyridine dihalides cures more rapidly than butyl rubber halogenated with elemental halogen.

Example 3 (i.e., Control, Sample (d) and Sample (e))

*Control.*—A total of 100 g. of an isobutylene-isoprene butyl rubber copolymer, containing 1.51 mole percent unsaturation, were dissolved in 1000 ml. of an aluminum chloride treated hexane fraction, and chlorinated at room temperature with 1.91 g. of elemental chlorine (i.e., one mole of chlorine per mole of polymer double bonds) which was introduced in gaseous form through a dispersator tube beneath the surface of the solution.

After a total reaction time of one hour, the product was isolated using a solution-precipitation technique wherein the solvent was hexane and acetone the precipitant. Following each precipitation the supernatant liquid was decanted from the polymer and fresh solvent added. Three solutions and precipitations were effected. The residual solvents were stripped from the product by heating for 16 hours at 60° C. under 180 mm. of mercury pressure absolute.

*Sample (d) of the invention.*—The "control" run of Example 3 was repeated in every respect except that the butyl rubber was halogenated by means of 4.04 grams of pyridine dichloride (i.e., one mole of reagent per mole of polymer double bonds).

*Sample (e) of the invention.*—The "control" run of Example 3 was again repeated in every respect except that the butyl rubber was halogenated by means of 8.06 grams of pyridine dichloride (i.e., 2 moles of reagent per mole of polymer double bonds).

The chlorinated products of Example 3 were analyzed and their chlorine content and molecular weights determined to be as follows:

| Product | Weight Percent Combined Chlorine | Viscosity Average Molecular Weight ($\times 10^{-3}$) |
|---|---|---|
| Control | 1.05 | 401 |
| Sample (d) | 0.92 | 465 |
| Sample (e) | 0.99 | 453 |

The above data show that chlorinated products of higher molecular weight result when butyl rubber is halogenated by means of pyridine dichloride, even when an excess of reagent is used, than when butyl rubber is halogenated by means of elemental chlorine.

Resort may be had to modifications and variations of the disclosed embodiments without departing from the spirit of the invention or the scope of the appended claims.

What is claimed is:

1. A process for producing halogenated isoolefin-multiolefin butyl rubber which comprises dissolving issoolefin-multiolefin butyl rubber in an inert solvent, adding thereto about 0.1 to 10.0 moles of a pyridine dihalide per mole of double bonds in said butyl rubber, regulating the temperature to between about 0° and +150° C. and conducting the halogenation reaction for between about 1 and 360 minutes to provide a product with a relatively high unsaturation.

2. A process according to claim 1 in which the pyridine dihalide is pyridine dichloride.

3. A process according to claim 1 in which the pyridine dihalide is pyridine dibromide.

4. A process which comprises dissolving 100 grams of an isobutylene-isoprene butyl rubber copolymer into an aluminum chloride treated hexane fraction; adding thereto 6.5 to 9.75 grams of pyridine dibromide; regulating the temperature of about 69° C.; conducting the halogenation reaction for 2 hours to provide a product with an iodine number of 44.0 cgs. of $I_2$/g.; and curing said product at a temperature of 287° F. for 15 to 30 minutes to form a vulcanizate having a tensile strength of at least 2,018 p.s.i. and a 300% modulus of at least 2,018 p.s.i.

References Cited in the file of this patent

UNITED STATES PATENTS

| | | |
|---|---|---|
| 2,361,072 | Vining | Oct. 24, 1944 |
| 2,631,984 | Crawford et al. | Mar. 17, 1953 |
| 2,732,354 | Morrissey | Jan. 24, 1956 |
| 2,739,141 | Ernst | Mar. 20, 1956 |
| 2,742,478 | Bavly | Apr. 17, 1956 |
| 2,804,448 | Hallenbeck | Aug. 27, 1957 |
| 2,891,595 | Kuntz | June 23, 1959 |